(12) United States Patent
Meyer

(10) Patent No.: US 11,365,650 B2
(45) Date of Patent: Jun. 21, 2022

(54) MOUNTING APPARATUS FOR A GAS TURBINE ENGINE

(71) Applicant: ROLLS-ROYCE plc, London (GB)

(72) Inventor: Richard Meyer, Derby (GB)

(73) Assignee: ROLLS-ROYCE PLC, London (GB)

( * ) Notice: Subject to any disclaimer, the term of this patent is extended or adjusted under 35 U.S.C. 154(b) by 215 days.

(21) Appl. No.: 16/734,693

(22) Filed: Jan. 6, 2020

(65) Prior Publication Data
US 2020/0224556 A1   Jul. 16, 2020

(30) Foreign Application Priority Data

Jan. 16, 2019 (GB) ..................... 1900609

(51) Int. Cl.
*F02C 7/20* (2006.01)
*F01D 25/28* (2006.01)
*B64D 27/26* (2006.01)

(52) U.S. Cl.
CPC ............. *F01D 25/28* (2013.01); *B64D 27/26* (2013.01); *F02C 7/20* (2013.01); *B64D 2027/268* (2013.01); *F05D 2220/323* (2013.01); *F05D 2240/90* (2013.01)

(58) Field of Classification Search
CPC ........ B64D 2027/262; B64D 2027/266; B64D 2027/268
See application file for complete search history.

(56) References Cited

U.S. PATENT DOCUMENTS

| 539,462 | A | * | 5/1895 | Weiant | F16L 3/10 |
| | | | | | 126/318 |
| 577,284 | A | * | 2/1897 | Camp | F16L 3/00 |
| | | | | | 138/140 |
| 1,760,458 | A | * | 5/1930 | Weber | F16L 3/1008 |
| | | | | | 248/74.1 |
| 3,750,983 | A | * | 8/1973 | Morris | B64D 27/18 |
| | | | | | 244/54 |

(Continued)

FOREIGN PATENT DOCUMENTS

| EP | 0 147 878 A1 | 7/1985 | |
| FR | 2806699 B1 | * 5/2002 | ............. B64D 27/26 |
| WO | 2018/116083 A1 | 6/2018 | |

OTHER PUBLICATIONS

May 20, 2020 extended Search Report issued in European Patent Application No. 19216667.6.

(Continued)

*Primary Examiner* — Todd E Manahan
*Assistant Examiner* — Marc J Amar
(74) *Attorney, Agent, or Firm* — Oliff PLC

(57) ABSTRACT

A mounting apparatus for mounting a gas turbine engine to an aircraft. The mounting apparatus includes a thrust strut operably connected to the gas turbine engine and the aircraft. The thrust strut defines a thrust strut axis. The mounting apparatus further includes a restraining structure. The restraining structure includes a bracket circumferentially disposed on the thrust strut and at least one elongate member connected to the bracket and the gas turbine engine. The restraining structure radially and circumferentially constrains the thrust strut with respect to the thrust strut axis of the thrust strut while allowing the thrust strut to move in the direction of thrust strut axis.

14 Claims, 10 Drawing Sheets

(56) References Cited

U.S. PATENT DOCUMENTS

| | | | | |
|---|---|---|---|---|
| 4,471,609 A * | 9/1984 | Porter | ............ | F02C 7/20 |
| | | | | 60/797 |
| 4,603,821 A * | 8/1986 | White | ............ | B64D 27/18 |
| | | | | 244/54 |
| 5,435,506 A * | 7/1995 | Wiley | ............ | F16L 3/10 |
| | | | | 248/74.1 |
| 6,330,985 B1 | 12/2001 | Manteiga et al. | | |
| 6,494,403 B2 * | 12/2002 | Jule | ............ | B64D 27/18 |
| | | | | 244/54 |
| 8,870,132 B2 * | 10/2014 | Sampson | ............ | F16L 3/22 |
| | | | | 248/74.1 |
| 2003/0029133 A1 | 2/2003 | Czachor et al. | | |
| 2003/0094547 A1 * | 5/2003 | Wilkinson, III | ...... | F16L 3/1008 |
| | | | | 248/74.1 |
| 2013/0118627 A1 * | 5/2013 | Utay | ............ | F16L 55/035 |
| | | | | 248/74.4 |
| 2014/0000999 A1 * | 1/2014 | Boulet | ............ | B64C 1/062 |
| | | | | 188/377 |
| 2015/0204243 A1 * | 7/2015 | Charron | ............ | F01D 9/023 |
| | | | | 60/796 |
| 2016/0167797 A1 * | 6/2016 | Stretton | ............ | B64D 27/26 |
| | | | | 244/54 |
| 2016/0215654 A1 | 7/2016 | Ancuta et al. | | |

OTHER PUBLICATIONS

Search Report of the Intellectual Property of the United Kingdom for GB 1900609.7 with search date of Jul. 5, 2019.

* cited by examiner

MOUNTING APPARATUS FOR A GAS TURBINE ENGINE

CROSS-REFERENCE TO RELATED APPLICATIONS

This specification is based upon and claims the benefit of priority from UK Patent Application Number GB1900609.7 filed on 16 Jan. 2019, the entire contents of which are incorporated herein by reference.

BACKGROUND OF THE INVENTION

The present disclosure concerns a mounting apparatus, and in particular a mounting apparatus for a gas turbine engine.

A mounting arrangement for a gas turbine engine typically includes one or more thrust struts that connect the gas turbine engine to a mounting block. The mounting block is connected to a part of an aircraft. The thrust struts transmit engine thrust loads to the mounting block. The thrust struts may be subjected to vibrations during operation of the gas turbine engine. For example, a natural frequency of the thrust strut may be at a forcing frequency of one or more rotor speeds of the gas turbine engine. In some cases, there may not be any frequencies at which the thrust struts can be tuned to avoid being driven by the operating frequencies of the rotors. The vibrations of the thrust strut may be transmitted to the gas turbine engine and the aircraft. The vibrations may reduce a lifespan of various components of the gas turbine engine and the aircraft.

BRIEF SUMMARY OF THE INVENTION

The present disclosure provides a mounting apparatus and an aircraft as set out in the appended claims.

According to a first aspect there is provided a mounting apparatus for mounting a gas turbine engine to an aircraft, the mounting apparatus comprising:

a thrust strut operably connected to the gas turbine engine and the aircraft, the thrust strut defining a thrust strut axis along a length of the thrust strut;

a restraining structure comprising:

a bracket circumferentially disposed on the thrust strut; and at least one elongate member connected to the bracket and the gas turbine engine, wherein the restraining structure radially and circumferentially constrains the thrust strut with respect to the thrust strut axis of the thrust strut while allowing the thrust strut to move along the thrust strut axis.

The restraining structure may increase a natural frequency of vibration of the thrust strut outside an envelope of forcing frequencies of engine spools or rotors. In other words, the restraining structure may increase a vibration frequency of the thrust strut beyond the forcing frequencies associated with the gas turbine engine. Further, the restraining structure may prevent or attenuate the vibrations of the thrust strut. For example, the restraining structure may prevent vibrations in bow modes of the thrust strut.

The restraining structure may circumferentially and radially restrain the thrust strut. However, the restraining structure may be flexible or compliant along the thrust strut axis of the thrust strut. Specifically, the restraining structure allows the thrust strut to move along the axial direction of the thrust strut. For the restraining structure to be flexible along the axial direction of the thrust strut, the stiffness of the restraining structure is also relatively low along the axial direction of the thrust strut as compared to thrust or axial loads of the thrust strut. Therefore, the thrust strut may remain statically determinate as an axial load applied by the restraining structure is a small fraction or a small percentage of the thrust load experienced by the thrust strut. Consequently, the statically determinate configuration of the thrust strut may not be affected due to the presence of the restraining structure.

The bracket may be fastened or connected to the thrust strut so that there is no relative movement between the thrust strut and the bracket. In some embodiments, the bracket may be clipped or clamped onto the thrust strut by a clipping member. The clipping member may have a one-part configuration or a two-part configuration. In some other embodiments, an interference fit may be provided between the bracket and the thrust strut.

The restraining structure may have a simple design which is cheap and easy to manufacture and incorporate in the gas turbine engine. The restraining structure may also be retrofitted to the gas turbine engine. The restraining structure may eliminate the need for thrust struts with excessively large diameter. The benefits of the design of the restraining structure may also be reasonably easy to establish with computational methods (e.g., finite element methods) rather than relying on engine testing.

In some embodiments, the at least one elongate member may be adapted to flex to allow the thrust strut to move along the thrust strut axis. The at least one elongate member may deform or flex to allow the bracket to move along the thrust strut axis of thrust strut, thereby providing axial compliance. The at least one elongate member may therefore provide flexibility to the restraining structure along the thrust strut axis. Due to axial compliance, the thrust strut may remain statically determinate despite the presence of the restraining structure.

In some embodiments, the bracket may comprise an annular portion disposed around the thrust strut. A shape of the annular portion may depend upon a shape of the thrust strut. In some embodiments, an interference fit may be provided between the annular portion and the thrust strut so that there is no relative movement between the thrust strut and the annular portion.

In some embodiments, the bracket may further comprise a pair of flange portions connected to the annular portion. The at least one elongate member may be connected to at least one of the pair of flange portions. The at least one elongate member may be connected to at least one of the pair of flange portions by various methods, such as welding, brazing, fasteners and adhesives.

In some embodiments, the bracket may comprise an annular member disposed around the thrust strut. The bracket may further comprise a first clipping member including a first curved portion disposed at least partly around the annular member and a pair of first flange portions. Each of the pair of first flange portions is disposed at a respective end of the first curved portion. The bracket may further comprise a second clipping member including a second curved portion disposed at least partly around the annular member and a pair of second flange portions. Each of the pair of second flange portions is disposed at a respective end of the second curved portion. Each of the pair of second flange portions is connected to a respective first flange portion of the pair of first flange portions. The first and second clipping members may clamp the annular member onto the thrust strut. In some embodiments, each of the pair of second flange portions may be detachably connected to the respective first flange portion by a fastener. The pair of first flange portions may therefore be easily detached from the second flange portions to remove a clamping force on the annular member. This may enable the annular member to be removed from the thrust strut for various purposes, such as servicing, repair and replacement.

In some embodiments, the at least one elongate member may be connected to at least one of the pair of first flange portions and at least one of the pair of second flange portions. The at least one elongate member may be connected to at least one of the pair of first flange portions and at least one of the pair of second flange portions by various methods, such as welding, brazing, fasteners and adhesives.

In some embodiments, the bracket may comprise an annular member disposed around the thrust strut and a clipping member. The clipping member may comprise a curved portion disposed at least partly around the annular member. The curved portion includes a pair of split ends. The curved portion may further comprise a pair of first flange portions connected to each other. Each of the pair of first flange portions is disposed at a respective split end of the pair of split ends. The clipping member may further comprise a second flange portion extending from the curved portion and spaced apart from the pair of first flange portions. The clipping member may clamp the annular member onto the thrust strut. In some embodiments, each of the pair of first flange portions may be detachably connected to each other by a fastener. The pair of first flange portions may therefore be easily detached from each other to remove a clamping force on the annular member. This may enable the annular member to be removed from the thrust strut for various purposes, such as servicing, repair and replacement.

In some embodiments, the at least one elongate member may be connected to one or more of the pair of first flange portions and the second flange portion. The at least one elongate member may be connected to one or more of the pair of first flange portions and the second flange portion by various methods, such as welding, brazing, fasteners and adhesives. In some embodiments, the at least one elongate member may have a rectangular cross-section.

In some embodiments, the at least one elongate member may be connected to a flange of the gas turbine engine. The flange may be an existing flange of the gas turbine engine. The restraining structure may therefore be retrofitted to the gas turbine engine.

In some embodiments, the at least one elongate member may be connected to a boss of the gas turbine engine. In some embodiments, the boss may be an existing boss of the gas turbine engine. In some other embodiments, the boss may be fitted for attachment with the at least one elongate member.

In some embodiments, the at least one elongate member may be connected to an engine casing of the gas turbine engine. The at least one elongate member may be connected to the engine casing by various methods, such as fasteners, welding, brazing, and adhesives.

In some embodiments, the at least one elongate member may be connected to a nacelle of the gas turbine engine. The at least one elongate member may be connected to the engine casing by various methods, such as fasteners, welding, brazing, and adhesives.

The at least one elongate member may be connected to the engine casing or the nacelle to suit the particular application.

In some embodiments, the restraining structure may comprise a pair of the elongate members. A number of elongate members may be varied to suit the particular application.

In some embodiments, the mounting apparatus may further comprise a plurality of the restraining structures spaced apart from each other along the length of the thrust strut. The restraining structures may be disposed on sections of the thrust strut which are expected to experience high strains for one or more vibrational modes of the thrust strut.

According to a second aspect there is provided an aircraft comprising a gas turbine engine, wherein the gas turbine engine is mounted to the aircraft with the mounting apparatus of the first aspect.

The skilled person will appreciate that, except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE SEVERAL VIEWS OF THE DRAWING

Embodiments will now be described by way of example only, with reference to the Figures, in which.

DETAILED DESCRIPTION OF THE INVENTION

Figure 1:
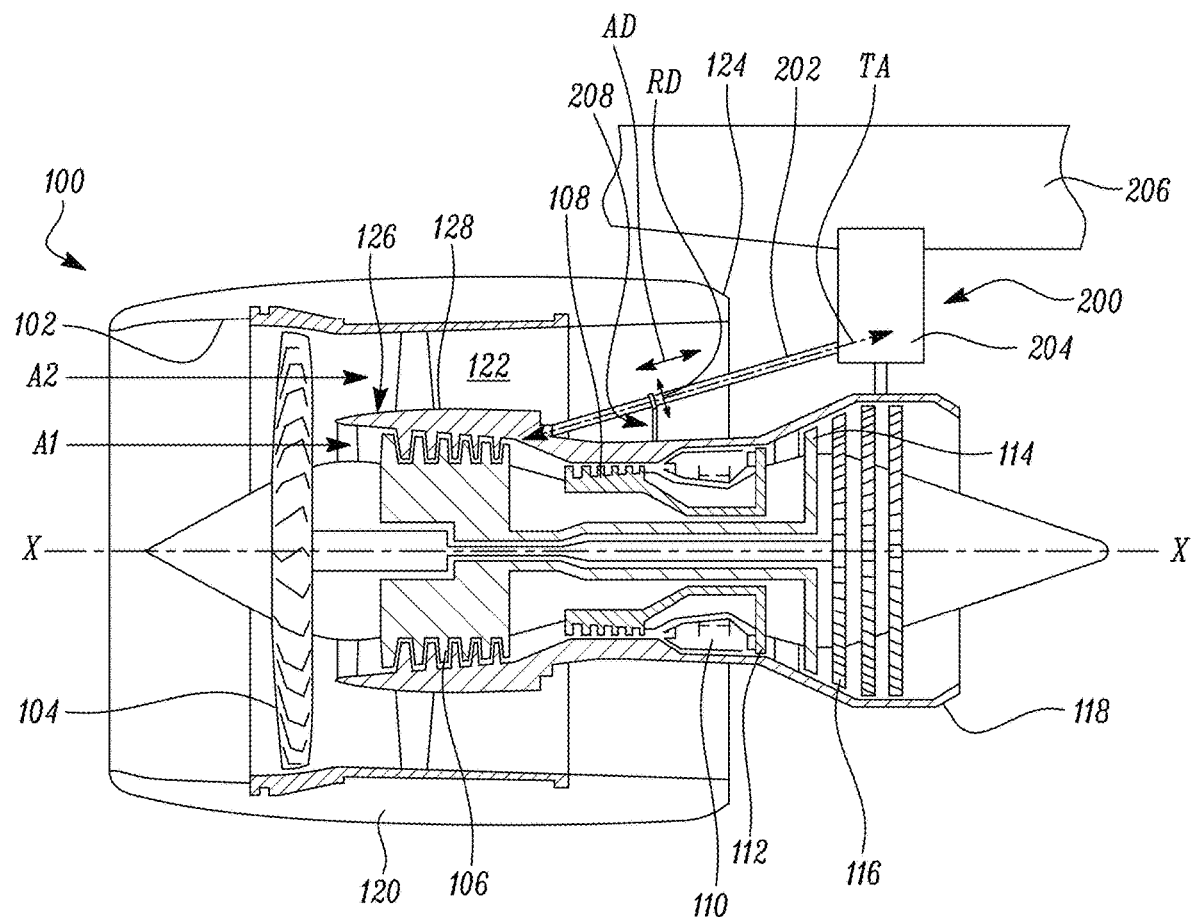
FIG. 1 is a sectional side view of a gas turbine engine including a mounting apparatus.

With reference to FIG. 1, a gas turbine engine is generally indicated at 100, having a principal and rotational axis X-X. The gas turbine engine 100 (interchangeably referred to as "the engine 100") comprises, in axial flow series, an air intake 102, a propulsive fan 104, an intermediate pressure compressor 106, a high-pressure compressor 108, combustion equipment 110, a high-pressure turbine 112, an intermediate pressure turbine 114, a low-pressure turbine 116 and a core engine exhaust nozzle 118. A nacelle 120 generally surrounds the engine 100 and defines the air intake 102, a bypass duct 122 and a bypass exhaust nozzle 124.

During operation, air entering the air intake 102 is accelerated by the propulsive fan 104 to produce two air flows: a first air flow "A1" into the intermediate pressure compressor 106 and a second air flow "A2" which passes through the bypass duct 122 to provide propulsive thrust. The intermediate pressure compressor 106 compresses the air flow directed into it before delivering that air to the high-pressure compressor 108 where further compression takes place.

The compressed air exhausted from the high-pressure compressor 108 is directed into the combustion equipment 110 where it is mixed with fuel and the mixture combusted. The resultant hot combustion products then expand through, and thereby drive the high, intermediate and low-pressure turbines 112, 114, 116 before being exhausted through the core engine exhaust nozzle 118 to provide additional propulsive thrust. The high, intermediate and low pressure turbines 112, 114, 116 drive respectively the high-pressure compressor 108, the intermediate pressure compressor 106 and the propulsive fan 104, each by suitable interconnecting shaft and/or gear train.

The engine 100 further includes a core engine 126 that includes various components, such as the intermediate pressure compressor 106, the high-pressure compressor 108, the combustion equipment 110, the high-pressure turbine 112, the intermediate pressure turbine 114, the low-pressure turbine 116 and the core engine exhaust nozzle 118. The core engine 126 further includes an engine casing 128 for at least partially enclosing one or more components of the core engine 126.

A mounting apparatus 200 is provided for mounting the engine 100 to an aircraft (not shown). The mounting apparatus 200 includes a thrust strut 202 operably connected to the gas turbine engine 100 and the aircraft. In the illustrated embodiment of FIG. 1, the thrust strut 202 is connected to the engine casing 128 at one end and an engine mount 204 at another end. The engine mount 204 is connected to a pylon 206. The pylon 206 is connected to the aircraft. For example, the pylon 206 may be mounted on a wing of the aircraft. The engine 100 is therefore attached to the wing of the aircraft. The aircraft includes the gas turbine engine 100. Furthermore, the gas turbine engine 100 is mounted to the aircraft with the mounting apparatus 200. The thrust strut 202 is operably connected to the aircraft via the engine mount 204 and the pylon 206. The thrust strut 202 may connect a front section of the core engine 126 to the pylon 206. Though one thrust strut 202 is illustrated in FIG. 1, the mounting apparatus 200 may include multiple thrust struts 202, for example, two thrust struts 202. The mounting apparatus 200 may include additional engine mounts (not shown) connected to the pylon 206 for restricting various degrees of freedom (DOF) of the engine 100.

The thrust strut 202 defines a thrust strut axis "TA" along a length of the thrust strut 202. An axial direction "AD" of the thrust strut 202 is parallel to the thrust strut axis "TA" of the thrust strut 202. The thrust strut axis "TA" may further coincide with a central axis of the thrust strut 202. Further, the thrust strut 202 may axially transmit loads from the engine 100 to the pylon 206. In other words, the thrust strut 202 may transmit loads along the axial direction "AD". The thrust strut 202 may also experience vibrations during operation of the engine 100. The mounting apparatus 200 further includes a restraining structure 208 disposed around the thrust strut 202 and connected to the engine casing 128. The restraining structure 208 is used to attenuate vibrations generated in the thrust strut 202. In some embodiments, the restraining structure 208 radially and circumferentially constrains the thrust strut 202 with respect to the thrust strut axis "TA" of the thrust strut 202 while allowing the thrust strut 202 to move along the direction of the thrust strut axis "TA". In other words, the restraining structure 208 restrains the thrust strut 202 along a radial direction "RD" and a circumferential direction "CD" (shown in FIG. 2) while allowing the thrust strut 202 to move along the axial direction "AD". The radial direction "RD" and the circumferential direction "CD" are defined with respect to the thrust strut axis "TA" of the thrust strut 202.

The engine 100 illustrated in FIG. 1 is exemplary in nature. Other gas turbine engines to which the present disclosure may be applied may have alternative configurations. By way of example such engines may have an alternative number of interconnecting shafts (e.g., two) and/or an alternative number of compressors and/or turbines. Further the engine may comprise a gearbox provided in a drive train from a turbine to a compressor and/or fan.

Whilst the described example relates to a turbofan engine, the disclosure may apply, for example, to any type of gas turbine engine, such as an open rotor (in which the fan stage is not surrounded by a nacelle) or a turboprop engine, for example.

Figure 2:
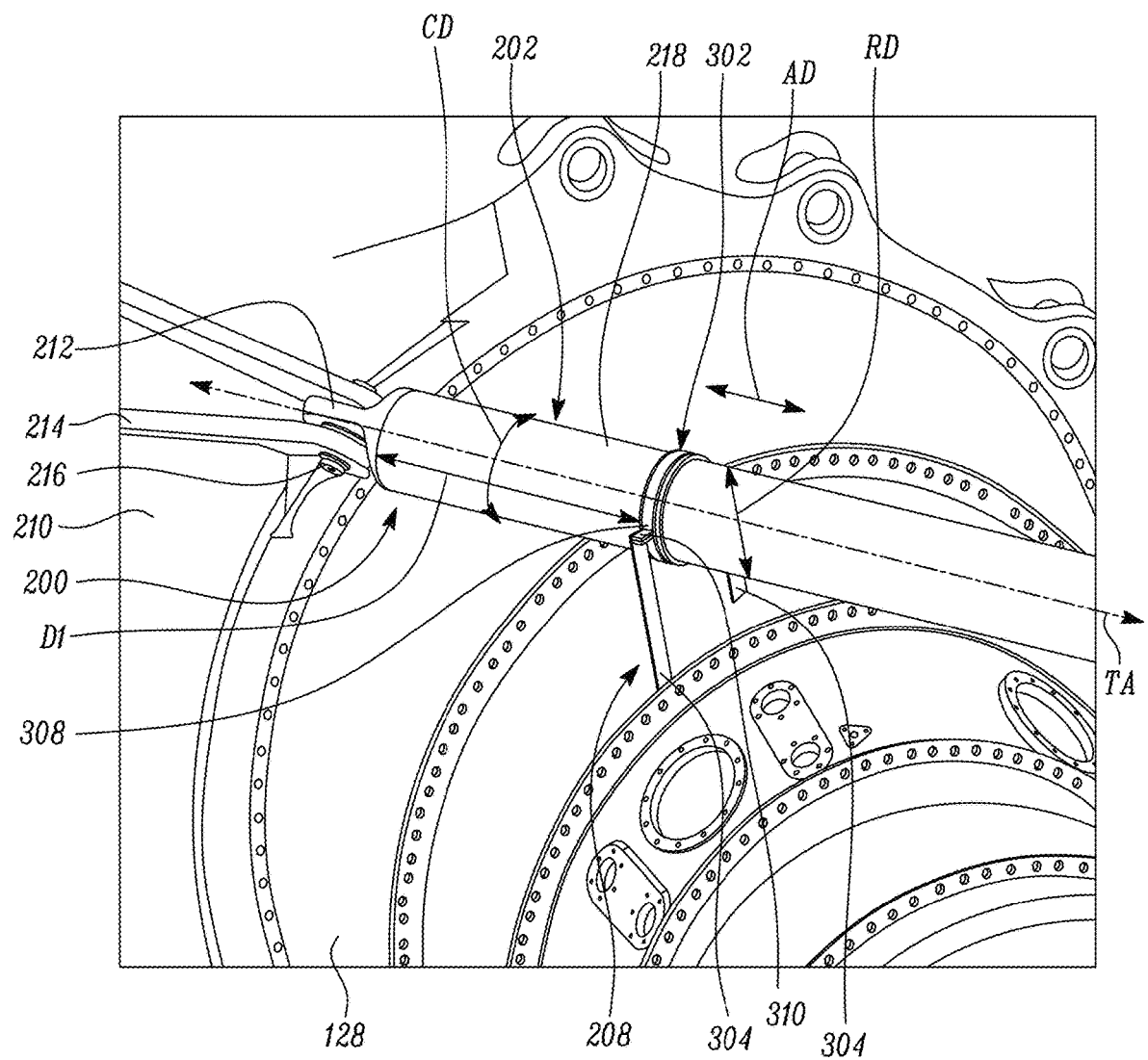
FIG. 2 is a perspective view of a portion of the gas turbine engine showing the mounting apparatus.

FIG. 2 illustrates a perspective view of the thrust strut 202 operably connected to a front part 210 of the engine casing 128. The thrust strut 202 may be obliquely mounted on the engine casing 128. The thrust strut 202 may therefore be inclined with respect to the axis X-X of the engine 100 (shown in FIG. 1). Specifically, the axial direction "AD" and the thrust strut axis "TA" of the thrust strut 202 are inclined with respect to the axis X-X of the engine 100. Further, a first end portion 212 of the thrust strut 202 is pivotally connected to a connecting bracket 214 of the engine casing 128 via a connecting pin 216. The thrust strut 202 is therefore operably connected to the engine casing 128 via a pivot joint. However, in other embodiments, the thrust strut 202 may be connected to the engine casing 128 by a ball and socket joint. A second end portion (not shown) of the thrust strut 202 is connected to the engine mount 204 (shown in FIG. 1). In some embodiments, the second end portion of the thrust strut 202 is connected to the engine mount 204 by a ball and socket joint. In some embodiments, the engine mount 204 includes a balance beam. The balance beam may balance axial loads of the thrust strut 202 with another thrust strut (not shown). In other embodiments, the engine mount 204 includes a yoke assembly for connection with the second end portion of the thrust strut 202. In some other embodiments, the thrust strut 202 may be connected to the engine casing 128 and the engine mount 204 by other connection methods. The thrust strut 202 has a main body 218 with the first end portion 212 and the second end portion disposed at both ends of the main body 218. The main body 218 of the thrust strut 202 has a substantially cylindrical shape. The main body 218 of the thrust strut 202 may have a hollow cylindrical configuration or a solid cylindrical configuration. However, in other embodiments, the main body 218 of the thrust strut 202 may have a non-circular shape, for example, polygonal, elliptical, and so forth. The thrust strut 202 may be made of a metallic material, a non-metallic material, a composite, and so forth. In some embodiments, the main body 218 of the thrust strut 202 defines the thrust strut axis "TA" and the axial direction "AD".

The connections at both ends of the thrust strut 202 may be designed to provide a statically determinate configuration to the thrust strut 202. The statically determinate configuration means that a load of the thrust strut 202 can be determined as there is a single axial load path through the thrust strut 202. Thus, the thrust strut 202 may be designed to substantially carry only thrust or axial loads, thereby preventing any conflict with other mounting components of the engine 100. Moreover, due to the statically determinate configuration, a thermal expansion of the engine 100 may not cause excessive load on the thrust strut 202.

Since the thrust strut 202 extends from the front part 210 of the engine 100 to the engine mount 204, the thrust strut 202 may be long and slender, i.e., have a large aspect ratio. The thrust strut 202 may therefore be susceptible to vibrations during operation of the engine 100. For example, a natural frequency of the thrust strut 202 may be at a forcing frequency of one or more rotor speeds of the engine 100 during operation. The fundamental modes of vibration of the thrust strut 202 that cause problems are typically bow modes (skipping rope modes) of the thrust strut 202. Further, a gas turbine engine with a geared arrangement typically has each engine rotor or spool operating with a larger frequency overlap. Consequently, there may not be any frequencies at which the thrust strut 202 can be tuned to avoid being driven by the operating frequencies of the engine spools. The restraining structure 208 may increase the natural frequency of vibration of the thrust strut 202 outside an envelope of forcing frequencies of the engine spools. In other words, the restraining structure 208 may increase a vibration frequency of the thrust strut 202 beyond the forcing frequencies associated with the engine 100. Further, the restraining structure 208 may prevent or attenuate the vibrations of the thrust strut 202. For example, the restraining structure 208 may prevent vibrations in the bow modes of the thrust strut 202.

The restraining structure 208 includes a bracket 302 circumferentially disposed on the thrust strut 202 and at least one elongate member 304 connected to the bracket 302 and the gas turbine engine 100. Specifically, the bracket 302 is circumferentially disposed on the main body 218 of the thrust strut 202. In the illustrated embodiment, the restraining structure 208 includes a pair of the elongate members 304. However, the restraining structure 208 may have one or more elongate members 304 to suit the particular application. Each of the pair of elongate members 304 may extend substantially perpendicular to the thrust strut axis "TA" of the thrust strut 202. The bracket 302 may be fastened or connected to the thrust strut 202 to prevent any relative movement between the bracket 302 and the thrust strut 202. Further, the bracket 302 includes an annular member 306 (see FIG. 6) disposed around the thrust strut 202 and a clipping member 308 disposed at least partly around the annular member 306. Specifically, the annular member 306 is disposed around the main body 218 of the thrust strut 202. The annular member 306 is provided on an outer surface of the main body 218 of the thrust strut 202. The clipping member 308 may clip or clamp the annular member 306 to the thrust strut 202 to prevent any relative movement between the annular member 306 and the thrust strut 202. In other embodiments, an interference fit may be provided between the annular member 306 and the thrust strut 202 to prevent any relative movement between the annular member 306 and the thrust strut 202. In case of the interference fit, the clipping member 308 may be absent. The bracket 302 may therefore be clipped or interference-fitted to the thrust strut 202 to prevent relative movement between the bracket 302 and the thrust strut 202.

In some embodiments, the clipping member 308 is a single part. In some other embodiments, the clipping member 308 includes two separate parts connected to each other, for example, by fasteners. The clipping member 308 further includes a pair of flange portions 310 (only one shown in FIG. 2). Each of the pair of elongate members 304 may be connected to a respective flange portion 310 of the pair of flange portions 310. The elongate members 304 may be connected to the flange portions 310 by various methods, for example, fasteners, welding, brazing, adhesives, and so forth. Further, the at least one elongate member 304 is connected to the engine casing 128 of the gas turbine engine 100. Specifically, the elongate members 304 may be connected to the engine casing 128 by various methods, such as fasteners, welding, brazing, adhesives, and the like. Each of the elongate members 304 may be connected to a flange or a boss of the engine 100. The flange or the boss may be provided on the engine casing 128. In some embodiments, the at least one elongate member 304 is adapted to flex to allow the thrust strut 202 to move along in the direction parallel with the thrust strut axis "TA". Specifically, each of the elongate members 304 is adapted to flex to allow the thrust strut 202 to move along the axial direction "AD".

The restraining structure 208 radially and circumferentially constrains the thrust strut 202 with respect to the thrust strut axis "TA" while allowing the thrust strut 202 to move along the direction of the thrust strut axis "TA". The restraining structure 208 adds restraint to the thrust strut 202 in the radial direction "RD" and the circumferential direction "CD". However, the restraining structure 208 is flexible or compliant along the axial direction "AD" of the thrust strut 202. The elongate members 304 may deform or flex to allow the bracket 302 to move along the axial direction "AD" to provide axial compliance. Specifically, the annular member 306 can move with the thrust strut 202 along the axial direction "AD" to provide axial compliance. Since the restraining structure 208 is flexible along the axial direction "AD", a stiffness of the restraining structure 208 is also relatively low along the axial direction "AD" as compared to the thrust or axial loads of the thrust strut 202. Therefore, the thrust strut 202 may remain statically determinate as an axial load applied by the restraining structure 208 is a small fraction or a small percentage of the thrust load experienced by the thrust strut 202. Consequently, the restraining structure 208 may not render the thrust strut 202 statically indeterminate. In other words, the statically determinate configuration of the thrust strut 202 may not be affected due to the presence of the restraining structure 208.

The restraining structure 208 may be configured to provide a desired stiffness in different directions, for example, the circumferential direction "CD", the radial direction "RD" and/or the axial direction "AD". For example, a thickness of the annular member 306, a length of the annular member 306, a thickness of the clipping member 308, and/or a thickness of the elongate members 304 may be chosen as per the desired stiffness in the different directions. An axial position of the annular member 306 along the length of the thrust strut 202 may also be tuned to affect frequencies of interest. For example, a distance "D1" between the annular member 306 and the first end portion 212 of the thrust strut 202 may be chosen to suit the particular application. An inner diameter of the annular member 306 may be less than or equal to an outer diameter of the main body 218 of the thrust strut 202. Further, an inner diameter of the clipping member 308 may be less than or equal to an outer diameter of the annular member 306. A length of the clipping member 308 may be less than or equal to the length of the annular member 306. A length of each of the elongate members 304 may depend upon a distance between the engine casing 128 and the thrust strut 202 at a region of attachment of the annular member 306. The elongate members 304 may have different lengths in order to account for a curvature of the engine casing 128 and the oblique mounting of the thrust strut 202. However, the elongate members 304 may have substantially equal lengths if the thrust strut 202 is co-axially mounted on the engine casing 128.

In the illustrated embodiment, the annular member 306 has a substantially annular shape. However, the shape of the annular member 306 may depend upon the shape of the main body 218 of the thrust strut 202. Specifically, the shape of an inner surface of the annular member 306 may be substantially similar to the shape of the outer surface of the main body 218 of the thrust strut 202. For example, if the main body 218 of the thrust strut 202 has a non-circular shape, the annular member 306 may have a similar non-circular shape. A shape of the clipping member 308 may be based on the shape of the annular member 306.

The annular member 306 may be made of a metallic material (metal or alloy), a non-metallic material, a composite, and so forth. In some embodiments, the annular member 306 is made of an anti-fretting material to prevent wear or damage to the main body 218 of the thrust strut 202. The clipping member 308 and the elongate members 304 may be made of a metallic material (metal or alloy), a non-metallic material, a composite, and so forth. Materials of the annular member 306, the clipping member 308 and the elongate members 304 may be chosen to suit the particular application.

The restraining structure 208 may have a simple design which is cheap and easy to manufacture and incorporate in the engine 100. For example, the annular member 306 may be slidably disposed on the main body 218 of the thrust strut 202. The clipping member 308 may be then disposed on the annular member 306 to clamp the annular member 306 onto the main body 218 of the thrust strut 202. The elongate members 304 may be then attached to the respective flange portions 310 and the engine casing 128. In some embodiments, the restraining structure 208 may be retrofitted to the gas turbine engine 100. Without the restraining structure 208, a thrust strut may typically need to have a large diameter to increase the natural frequencies beyond the forcing frequencies of the engine 100. The restraining structure 208 may eliminate the need for such thrust struts with excessively large diameter and/or thickness. The benefits of the design of the restraining structure 208 may also be reasonably easy to establish with computational methods (e.g., finite element methods) rather than relying on engine testing.

In the illustrated embodiment of FIG. 2, one thrust strut 202 is shown with the restraining structure 208. However, in other embodiments, multiple such thrust struts 202 may be present with each thrust strut 202 being provided with the restraining structure 208.

Figure 3:
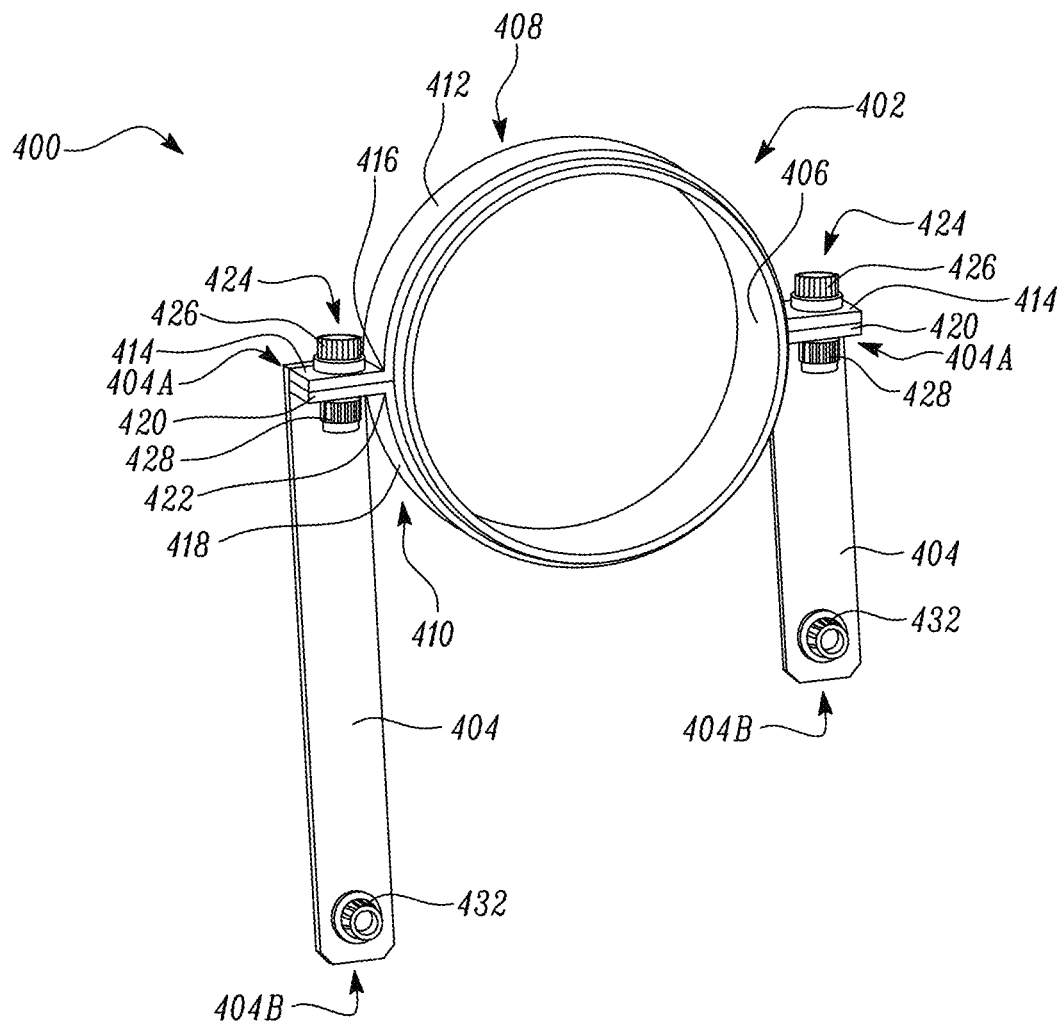
FIG. 3 is a perspective view of a restraining structure of the mounting apparatus.
Figure 4:
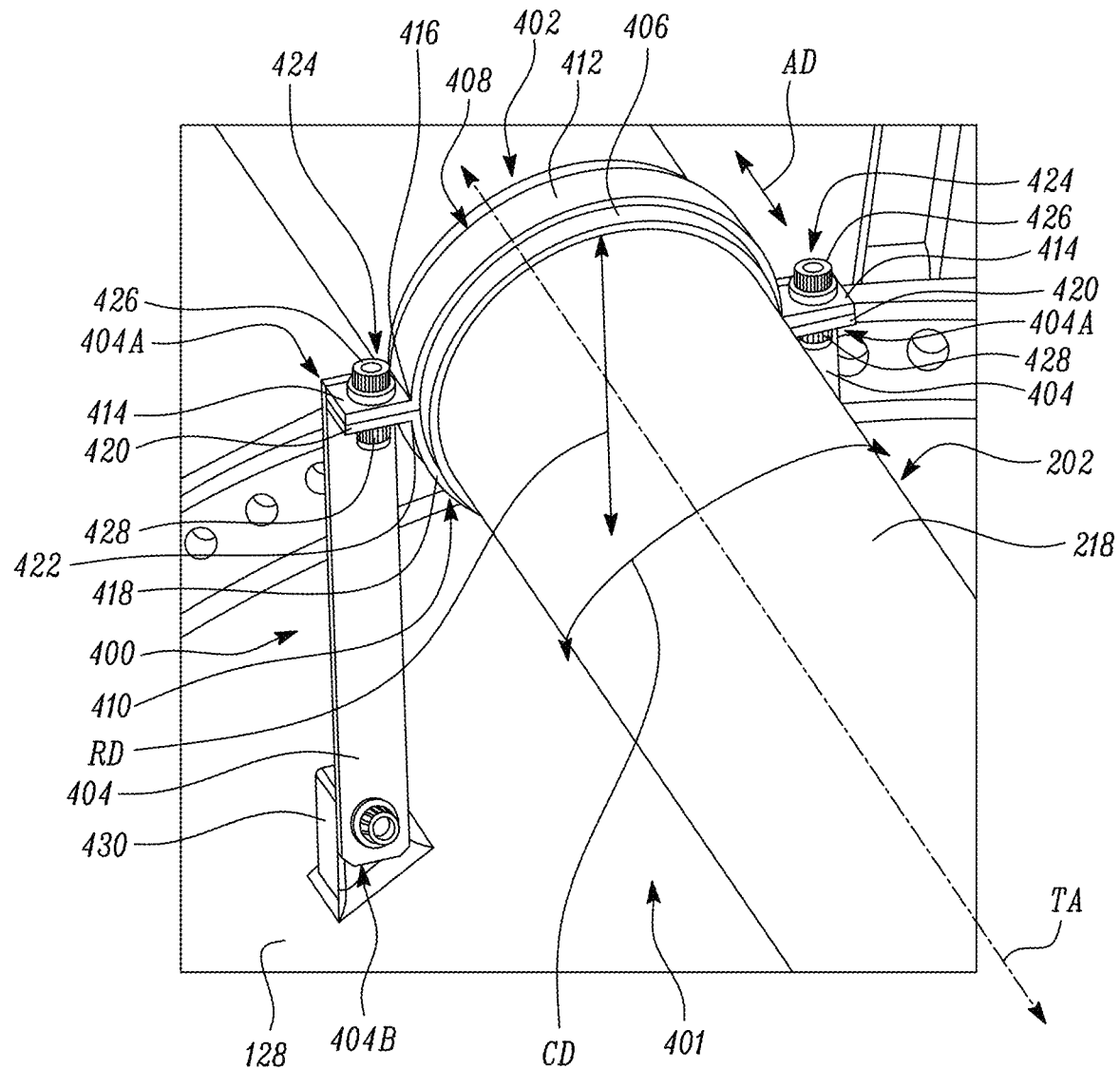
FIG. 4 is a perspective view of a portion of the gas turbine engine showing an alternative embodiment of the mounting apparatus.

FIG. 3 illustrates a perspective view of a restraining structure 400 according to another embodiment of the present disclosure. FIG. 4 illustrates the restraining structure 400 installed on the thrust strut 202. The restraining structure 400 may be part of a mounting apparatus 401 (shown in FIG. 4) or the mounting apparatus 200 (shown in FIGS. 1 and 2). The mounting apparatus 401 further includes the thrust strut 202. Referring to FIGS. 3 and 4, the restraining structure 400 includes a bracket 402 circumferentially disposed on the thrust strut 202 and at least one elongate member 404 connected to the bracket 402 and the gas turbine engine 100. Specifically, the bracket 402 is circumferentially disposed on the main body 218 of the thrust strut 202. In the illustrated embodiment, the restraining structure 400 includes a pair of the elongate members 404. However, the restraining structure 400 may have one or more elongate members 404 to suit the particular application. Each of the pair of elongate members 404 may extend along a direction that is substantially perpendicular to the axial direction "AD" of the thrust strut 202. In other words, each of the pair of elongate members 404 may extend substantially perpendicular to the thrust strut axis "TA". Further, the bracket 402 includes an annular member 406, a first clipping member 408 and a second clipping member 410. The annular member 406 is disposed around the thrust strut 202. Specifically, the annular member 406 is disposed around the main body 218 of the thrust strut 202. The annular member 406 is provided on an outer surface of the main body 218 of the thrust strut 202. The annular member 406 may have a substantially annular shape with a rectangular cross-section. However, the annular member 406 may have any alternative cross-sectional shape (e.g., circular) to suit the particular application.

The first and second clipping members 408, 410 may together surround at least a portion of the annular member 406. The first clipping member 408 includes a first curved portion 412 disposed at least partly around the annular member 406 and a pair of first flange portions 414. The first curved portion 412 defines two ends 416 (only one shown). Each of the pair of first flange portions 414 is disposed at a respective end 416 of the first curved portion 412. Similarly, the second clipping member 410 includes a second curved portion 418 disposed at least partly around the annular member 406 and a pair of second flange portions 420. The second curved portion 418 defines two ends 422 (only one shown). Each of the pair of second flange portions 420 is disposed at a respective end 422 of the second curved portion 418. Each of the pair of second flange portions 420 is connected to a respective first flange portion 414 of the pair of first flange portions 414. In the illustrated embodiment, the second flange portions 420 are detachably connected to the respective first flange portions 414 by respective fasteners 424. Each fastener 424 may include a nut 426 and a bolt 428. Alternatively, each fastener may include a screw. In other embodiments, the first flange portions 414 may be connected to the respective second flange portions 420 by alternative methods, such as welding, brazing, adhesives, and so forth. Each of the first flange portions 414 is disposed on the respective second flange portion 420. Further, each of the first flange portions 414 may have a substantially cuboidal shape extending from the respective end 416 of the first curved portion 412. Similarly, each of the second flange portion 420 may have a substantially cuboidal shape extending from the respective end 422 of the second curved portion 418. After connecting the first and second flange portions 414, 420, the first and second clipping members 408, 410 may clip or clamp the annular member 406 to the thrust strut 202 to prevent any relative movement between the annular member 406 and the thrust strut 202. Each of the first and second curved portions 412, 418 has a substantially semi-circular shape with a rectangular cross-section. The first and second flange portions 414, 420 may therefore be disposed at diametrically opposite ends of the annular member 406. Alternatively, the first and second curved portions 412, 418 may have different shapes. Further, each of the first and second curved portions 412, 418 may have any alternative cross-sectional shape (e.g., circular) to suit the particular application.

The at least one elongate member 404 is connected to at least one of the pair of first flange portions 414 and at least one of the pair of second flange portions 420. Specifically, each of the pair of elongate members 404 is connected to a respective first flange portion 414 and a respective second flange portion 420. Each of the elongate members 404 defines a first end 404A that is proximal to the bracket 402 and a second end 404B that is distal to the bracket 402. The first end 404A of each elongate member 404 may be connected to lateral surfaces of the respective first flange portion 414 and the respective second flange portion 420. The elongate members 404 may be connected to the respective first flange portions 414 and the respective second flange portions 420 by various methods, such as welding, brazing, adhesives, fasteners, and so forth. The second end 404B of each elongate member 404 may be connected to the engine casing 128. In the illustrated embodiment, the at least one elongate member 404 is connected to a boss 430 of the gas turbine engine 100. Specifically, each elongate member 404 is connected to a respective boss 430 (only one shown in FIG. 4) extending from the engine casing 128 of the gas turbine engine 100. Each elongate member 404 is detachably connected to the respective boss 430 by a fastener 432. Each of the elongate members 404 may define an aperture (not shown) proximal to the second end 404B. The fastener 432 may be received through the aperture of the respective elongate member 404. Further, the second end 404B of each elongate member 404 may be chamfered. The fastener 432 may be a nut and bolt assembly, a screw, and so forth. The boss 430 may define an aperture (not shown) for receiving the fastener 432. However, in some other embodiments, each elongate member 404 may be connected to the respective boss 430 by alternative methods, such as welding, brazing, adhesives, and so forth. The boss 430 may be an existing boss of the engine casing 128. Alternatively, the boss 430 may be a new boss fitted for coupling with the respective elongate member 404. The boss 430 may be integral with the engine casing 128. Alternatively, the boss 430 may be attached to the engine casing 128 by welding, brazing, adhesives, and the like.

Each of the elongate members 404 may have a substantially rectangular cross-section. However, each of the elongate members 404 may have any alternative cross-sectional shape (e.g., circular) to suit the particular application. A length of each of the elongate members 404 may depend upon a distance between the engine casing 128 and the thrust strut 202 at a region of attachment of the annular member 406. The elongate members 404 may have different lengths in order to account for the curvature of the engine casing 128 and the oblique mounting of the thrust strut 202. A distance between a surface of the engine casing 128 and the thrust strut 202 may be different at diametrically opposite ends of the thrust strut 202 because the thrust strut 202 is inclined with respect to the axis X-X of the engine 100. The elongate member 404 having the greater length may be attached to a portion of the engine casing 128 that is located at a greater distance from the thrust strut 202. Further, the elongate member 404 having the lesser length may be attached to another portion of the engine casing 128 that is located at a lesser distance from the thrust strut 202. However, in alternative embodiments, the elongate members 404 may have substantially equal lengths if the thrust strut 202 is co-axially mounted on the engine casing 128.

In some embodiments, the at least one elongate member 404 is adapted to flex to allow the thrust strut 202 to move along the axial direction of the thrust strut axis "TA". Specifically, each of the elongate members 404 is adapted to flex to allow the thrust strut 202 to move along the axial direction "AD". The restraining structure 400 radially and circumferentially constrains the thrust strut 202 with respect to the thrust strut axis "TA" while allowing the thrust strut 202 to move in the axial direction "AD". The restraining structure 400 adds restraint to the thrust strut 202 in the radial direction "RD" and the circumferential direction "CD". However, the restraining structure 400 is flexible or compliant along the axial direction "AD" of the thrust strut 202. The elongate members 404 deform or flex to allow the bracket 402 to move along the axial direction "AD" to provide axial compliance. Specifically, the annular member 406 can move with the thrust strut 202 along the axial direction "AD" to provide axial compliance. Since the restraining structure 400 is flexible along the axial direction "AD", a stiffness of the restraining structure 400 is also relatively low along the axial direction "AD" as compared to the thrust or axial loads of the thrust strut 202. Therefore, the thrust strut 202 may remain statically determinate as an axial load applied by the restraining structure 400 is a small fraction or a small percentage of the thrust load experienced by the thrust strut 202. Consequently, the restraining structure 400 may not render the thrust strut 202 statically indeterminate. In other words, the statically determinate configuration of the thrust strut 202 may not be affected due to the presence of the restraining structure 400.

The restraining structure 400 may be configured to provide a desired stiffness in different directions, for example, the circumferential direction "CD", the radial direction "RD" and/or the axial direction "AD". For example, a thickness of the annular member 406, a length of the annular member 406, a thickness of the first clipping member 408, a thickness of the second clipping member 410 and/or a thickness of the elongate members 404 may be chosen as per the desired stiffness in the different directions. An axial position of the annular member 406 along the length of the thrust strut 202 may also be tuned to affect frequencies of interest. An inner diameter of the annular member 406 may be substantially equal to the outer diameter of the main body 218 of the thrust strut 202. Further, an inner diameter of each of the first and second clipping members 408, 410 may be less than or equal to an outer diameter of the annular member 406. A length of each of the first and second clipping members 408, 410 may be less than or equal to the length of the annular member 406.

In the illustrated embodiment, the annular member 406 has a substantially annular shape. However, the shape of the annular member 406 may depend upon the shape of the main body 218 of the thrust strut 202. Specifically, the shape of an inner surface of the annular member 406 may be substantially similar to the shape of the outer surface of the main body 218 of the thrust strut 202. For example, if the main body 218 of the thrust strut 202 has a non-circular shape, the annular member 406 may have a similar non-circular shape. The shapes of the first and second clipping members 408, 410 may be based on the shape of the annular member 406.

The annular member 406 may be made of a metallic material (metal or alloy), a non-metallic material, a composite, and so forth. In some embodiments, the annular member 406 is made of an anti-fretting material to prevent wear or damage to the main body 218 of the thrust strut 202. The first and second clipping members 408, 410 and the elongate members 404 may be made of a metallic material (metal or alloy), a non-metallic material, a composite, and so forth. Materials of the annular member 406, the first clipping member 408, the second clipping member 410 and the elongate members 404 may be chosen to suit the particular application.

The restraining structure 400 may have a simple design which is cheap and easy to manufacture and incorporate in the engine 100. For example, the annular member 406 may be slidably disposed on the main body 218 of the thrust strut 202. The first and second clipping members 408, 410 may be then disposed on the annular member 406 and connected to each other via the fasteners 424 to clamp the annular member 406 onto the main body 218 of the thrust strut 202.

The elongate members 404 may be then attached to the respective first flange portions 414, the respective second flange portions 420 and the engine casing 128. In some embodiments, the restraining structure 400 may be retrofitted to the gas turbine engine 100. Without the restraining structure 400, a thrust strut may typically need to have a large diameter to increase the natural frequencies beyond the forcing frequencies of the engine 100. The restraining structure 400 may eliminate the need for such thrust struts with excessively large diameter. The benefits of the design of the restraining structure 400 may also be reasonably easy to establish with computational methods (e.g., finite element methods) rather than relying on engine testing.

The restraining structure 400 may also be easily removed from the thrust strut 202 and the engine casing 128 for various purposes, such as servicing, repair and/or replacement. For example, the elongate members 404 may be detached from the respective bosses 430 by loosening the fasteners 432. The fasteners 424 connecting the respective first and second flange portions 414, 420 may be loosened to remove a clamping force on the annular member 406. The restraining structure 400 may be then removed from the thrust strut 202 by sliding the annular member 406 along the thrust strut 202.

Figure 5:
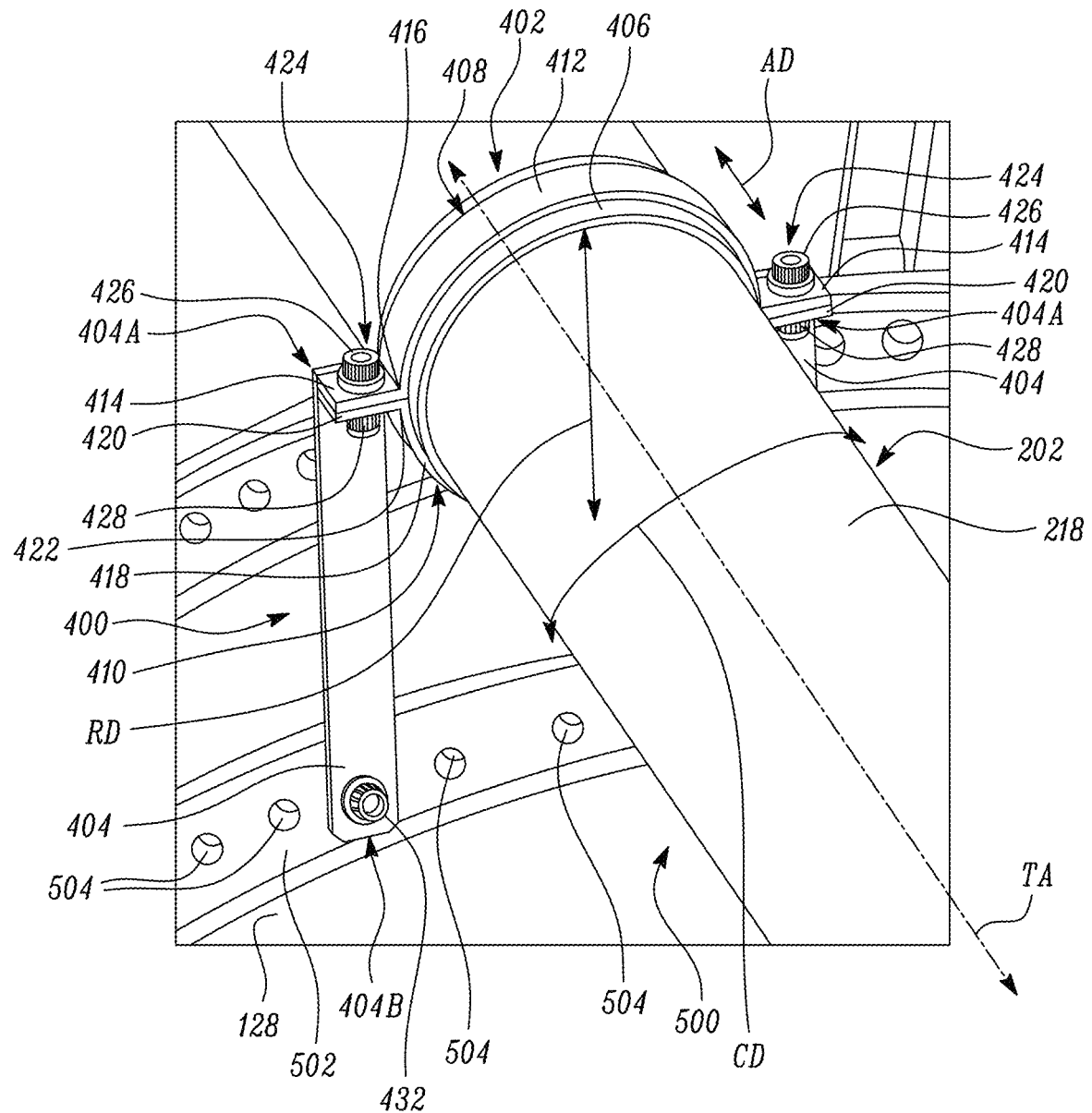
FIG. 5 is a perspective view of a portion of the gas turbine engine showing an alternative embodiment of the mounting apparatus.

FIG. 5 illustrates a perspective view of a mounting apparatus 500 including the restraining structure 400. As shown in FIG. 5, the at least one elongate member 404 is connected to a flange 502 of the gas turbine engine 100. Specifically, the pair of elongate members 404 are connected to the flange 502. The flange 502 may extend from the surface of the engine casing 128. The fastener 432 (only one shown in FIG. 5) connects the respective elongate member 404 to the flange 502. The fastener 432 may be received in one of the holes 504 of the flange 502. The flange 502 may be an existing flange of the engine casing 128.

Figure 6:
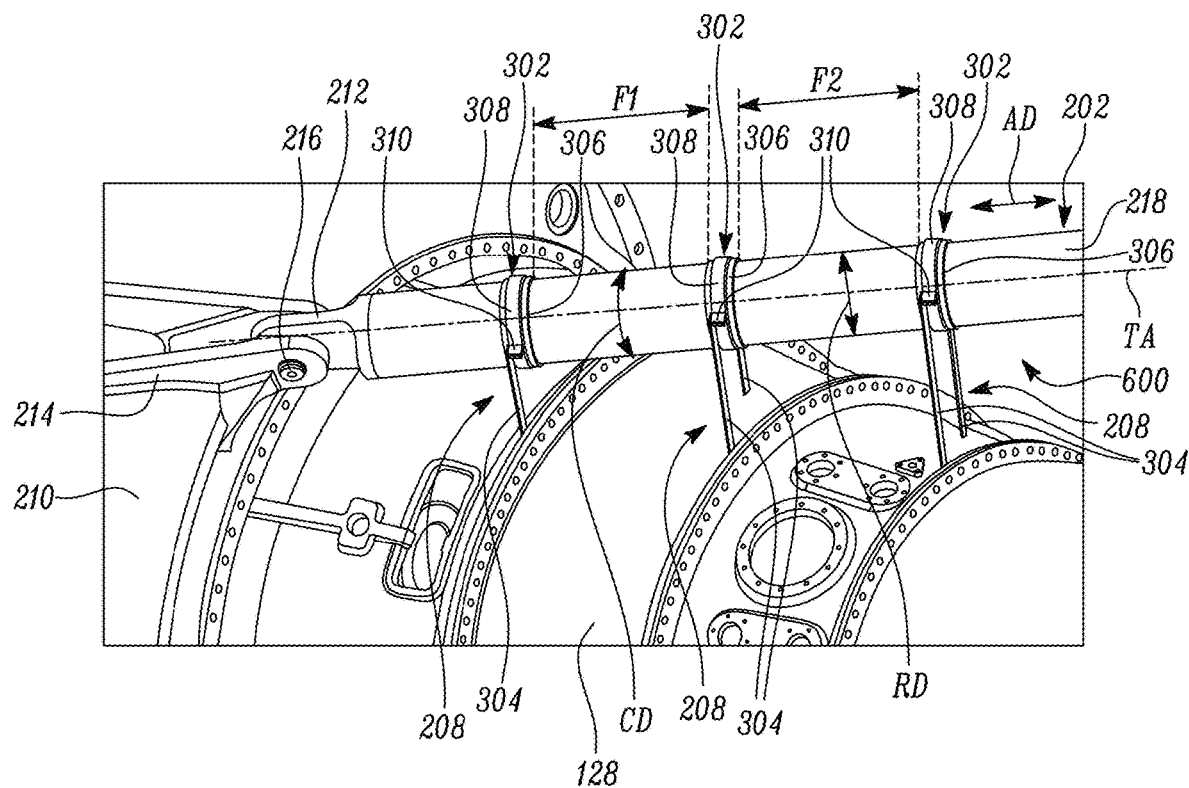
FIG. 6 is a perspective view of a portion of the gas turbine engine showing an alternative embodiment of the mounting apparatus.

FIG. 6 illustrates a mounting apparatus 600 including a plurality of the restraining structures 208 spaced apart from each other along the length of the thrust strut 202. In the illustrated embodiment of FIG. 6, three restraining structures 208 are disposed on the thrust strut 202. However, any number of restraining structures 208 may be provided based on application requirements. The restraining structures 208 may be disposed on sections of the thrust strut 202 which are expected to experience high strains for one or more vibrational modes of interest, for example, bow modes. A distance "F1" and a distance "F2" between adjacent restraining structures 208 may be chosen accordingly. The distances "F1" and "F2" may be substantially equal to each other. Alternatively, the distances "F1" and "F2" may be different from each other. Further, as shown in FIG. 6, lengths of the elongate members 304 of the corresponding restraining structures 208 vary based on distances between the thrust strut 202 and the surface of the engine casing 128 at the corresponding mounting locations of the restraining structures 208. For example, the lengths of the elongate members 304 may increase with an increase in the distance from the first end portion 212 of the thrust strut 202 due to an inclination of the thrust strut 202 with respect to a horizontal plane or axis.

Though a plurality of the restraining structures 208 are shown in FIG. 6, a plurality of the restraining structures 400 (shown in FIG. 3) may alternatively be disposed on the thrust strut 202. The restraining structures 400 may be spaced apart from each other along the length of the thrust strut 202. The elongate members 404 of one or more restraining structures 400 may be connected to respective bosses 430 (shown in FIG. 4). Alternatively or additionally, the elongate members 404 of one or more restraining structures 400 may be connected to respective flanges 502 (shown in FIG. 5). In some embodiments, one or more restraining structures 208 and one or more restraining structures 400 may be disposed on the thrust strut 202.

Figure 7:
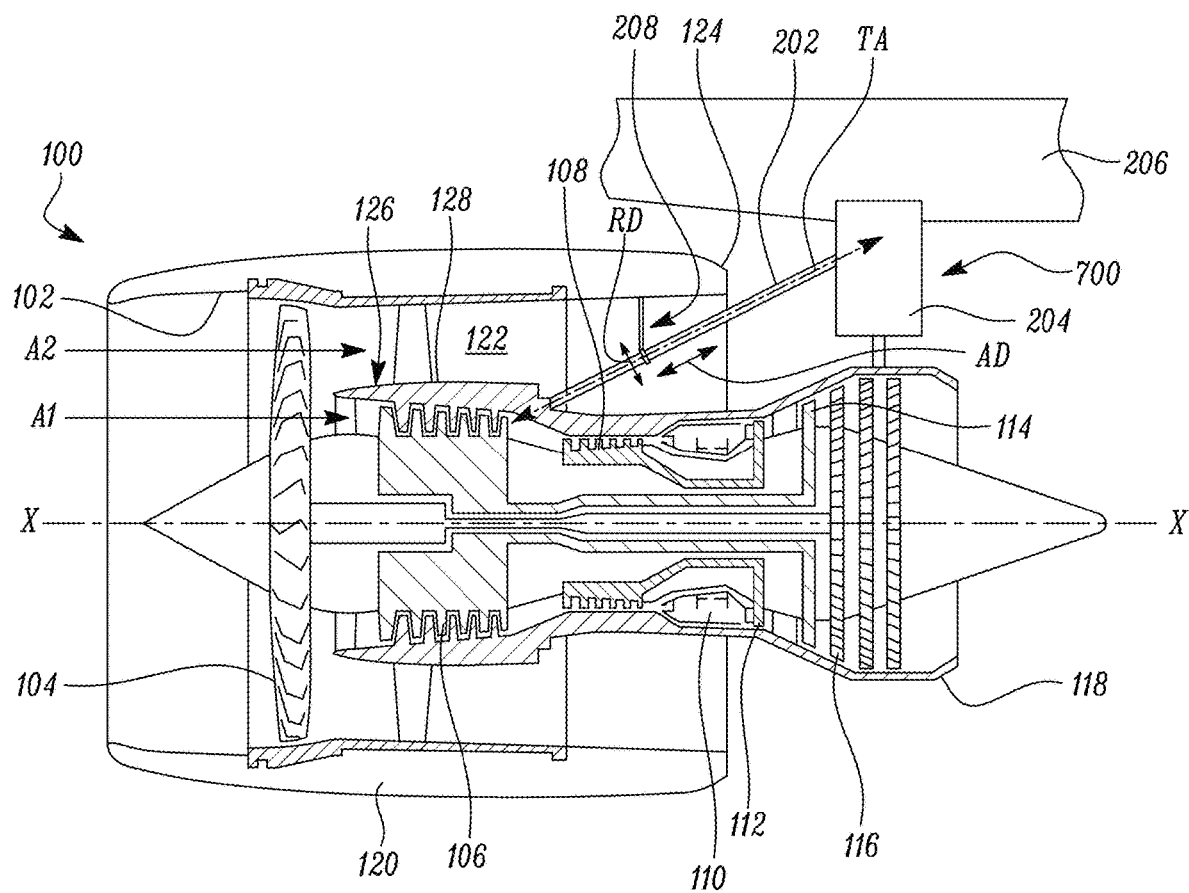
FIG. 7 is a sectional side view of the gas turbine engine showing an alternative embodiment of the mounting apparatus.

FIG. 7 illustrates the gas turbine engine 100 with a mounting apparatus 700. The mounting apparatus 700 is substantially similar to the mounting apparatus 200 shown in FIGS. 1 and 2. However, in the illustrated embodiment of FIG. 7, the restraining structure 208 is attached to the nacelle 120 instead of the engine casing 128. Specifically, the at least one elongate member 304 (shown in FIG. 2) is connected to the nacelle 120 of the gas turbine engine 100. Therefore, the at least one elongate member 304 is attached to a bypass side of the engine 100 instead of the core engine 126. In some embodiments, a plurality of the restraining structures 208 may be disposed along the thrust strut 202 with the corresponding elongate members 304 connected to the nacelle 120. In some other embodiments, one or more restraining structures 400 (shown in FIG. 3) may additionally or optionally be disposed on the thrust strut 202 with the corresponding elongate members 404 connected to the nacelle 120. The elongate members 404 of the one or more restraining structures 400 may be connected to respective bosses 430 (shown in FIG. 4) or to respective flanges 502 (shown in FIG. 5).

Figure 8:
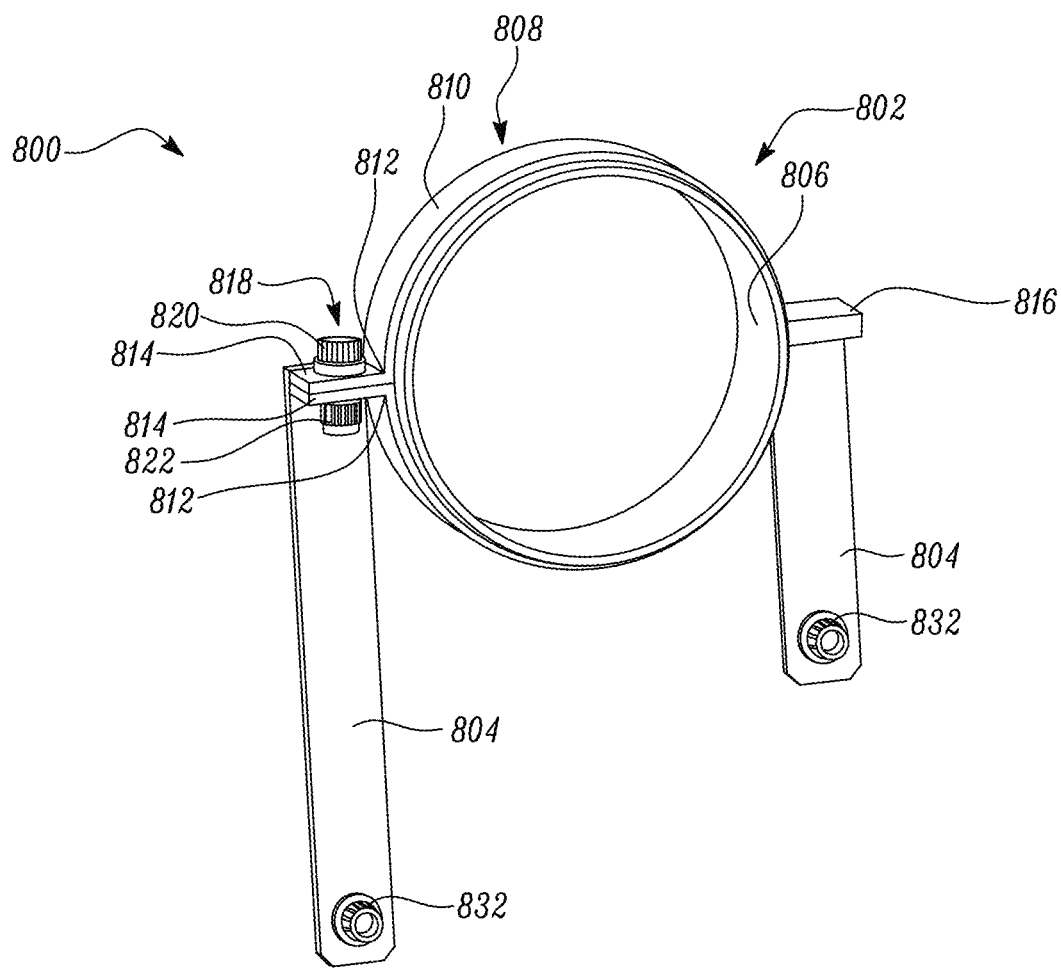
FIG. 8 is a perspective view of an alternative embodiment of the restraining structure.

FIG. 8 illustrates a restraining structure 800 according to another embodiment of the present disclosure. The restraining structure 800 is substantially similar to the restraining structure 400 (shown in FIG. 3). However, the restraining structure 800 includes a clipping member 808 that has a one-part configuration instead of a two-part configuration of the first and second clipping members 408, 410 of the restraining structure 400. The restraining structure 800 may be part of the mounting apparatus 200, 401, 500, 600, or 700.

The restraining structure 800 includes a bracket 802 circumferentially disposed on the thrust strut 202 and at least one elongate member 804 connected to the bracket 802 and the gas turbine engine 100. In the illustrated embodiment of FIG. 8, the restraining structure 800 includes a pair of the elongate members 804 equivalent to the pair of elongate members 404 of the restraining structure 400. The bracket 802 includes an annular member 806 equivalent to the annular member 406 of the restraining structure 400. The annular member 806 is configured to be disposed around the thrust strut 202. The clipping member 808 includes a curved portion 810 disposed at least partly around the annular member 806. The curved portion 810 includes a pair of split ends 812. Specifically, the curved portion 810 may have a substantially annular shape with the split ends 812. The clipping member 808 further includes a pair of first flange portions 814 connected to each other. Each of the pair of first flange portions 814 is disposed at a respective split end 812 of the pair of split ends 812. The clipping member 808 further includes a second flange portion 816 extending from the curved portion 810 and spaced apart from the pair of first flange portions 814. The pair of first flange portions 814 may be connected to each other by a fastener 818. The fastener 818 may include a nut 820 and a bolt 822. Each of the pair of first flange portions 814 may have a substantially cuboidal shape. Further, the second flange portion 816 may have a substantially cuboidal shape.

The at least one elongate member 804 is connected to one or more of the pair of first flange portions 814 and the second flange portion 816. In the illustrated embodiment, one of the elongate members 804 is connected to the pair of first flange portions 814. The other elongate member 804 is connected to the second flange portion 816. The elongate members 804 are connected to the engine casing 128 via respective fasteners 832 that are equivalent to the fasteners 432 of the restraining structure 400.

Figure 9:
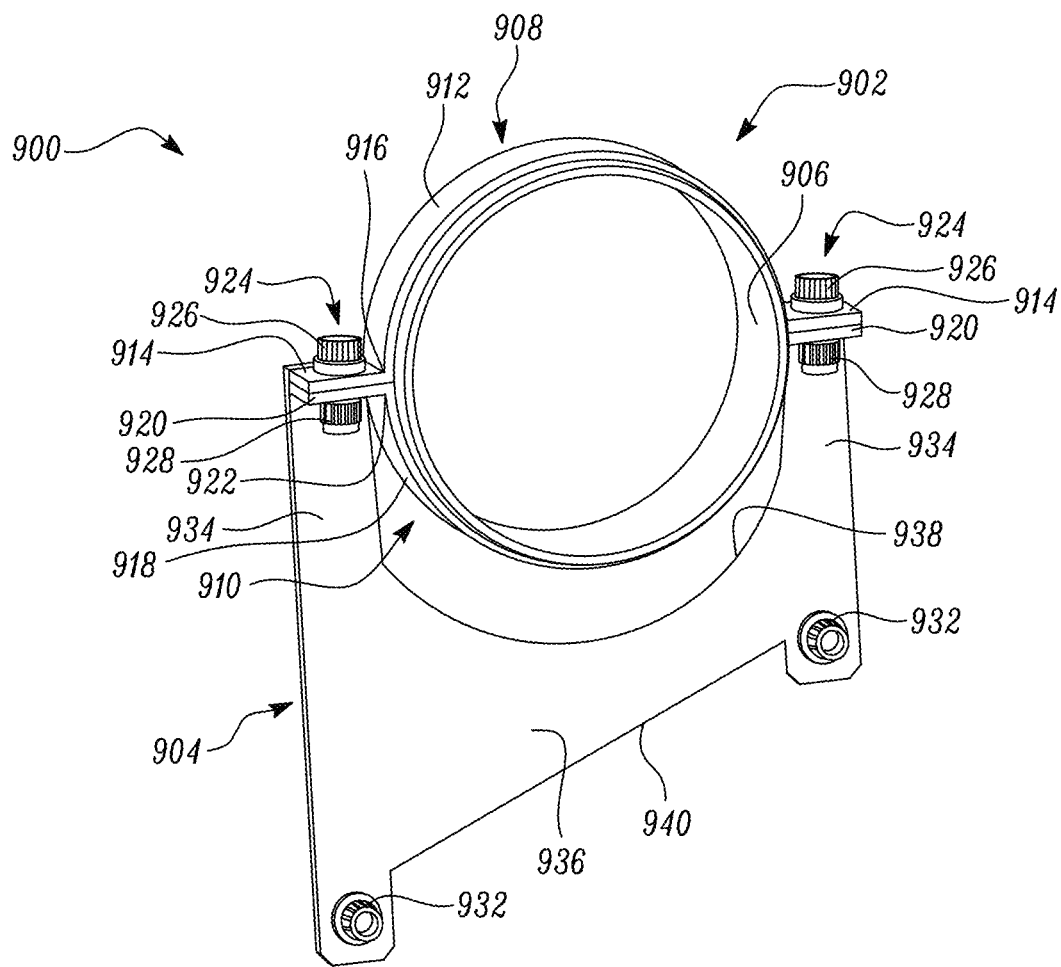
FIG. 9 is a perspective view of an alternative embodiment of the restraining structure.

FIG. 9 illustrates a restraining structure 900 according to another embodiment of the present disclosure. The restraining structure 900 is substantially similar to the restraining structure 400 (shown in FIG. 3). However, the restraining structure 900 includes a single elongate member 904 instead of the pair of elongate members 404 of the restraining structure 400. The restraining structure 900 may be part of the mounting apparatus 200, 401, 500, 600, or 700 described above.

The restraining structure 900 includes a bracket 902 circumferentially disposed around the thrust strut 202 and the elongate member 904 connected to the bracket 902 and the gas turbine engine 100. The bracket 902 includes an annular member 906 equivalent to the annular member 406 of the restraining structure 400. The annular member 906 is configured to be disposed around the thrust strut 202. The bracket further includes a first clipping member 908 and a second clipping member 910 equivalent to the first clipping member 408 and the second clipping member 410, respectively, of the restraining structure 400. The first clipping member 908 includes a first curved portion 912 disposed at least partly around the annular member 906 and a pair of first flange portions 914. The first curved portion 912 defines two ends 916 (only one shown). Each of the pair of first flange portions 914 is disposed at a respective end 916 of the first curved portion 912. Similarly, the second clipping member 910 includes a second curved portion 918 disposed at least partly around the annular member 906 and a pair of second flange portions 920. The second curved portion 918 defines two ends 922 (only one shown). Each of the pair of second flange portions 920 is disposed at a respective end 922 of the second curved portion 918. Each of the pair of second flange portions 920 is connected to a respective first flange portion 914 of the pair of first flange portions 914. In the illustrated embodiment, the second flange portions 920 are detachably connected to the respective first flange portions 914 by respective fasteners 924. Each fastener 924 may include a nut 926 and a bolt 928.

The elongate member 904 may be a wide member that connects the bracket 902 to the engine casing 128. The elongate member 904 may extend in a direction that is substantially perpendicular to the axial direction "AD" of the thrust strut 202. In other words, the elongate member 904 may extend substantially perpendicular to the thrust strut axis "TA". The elongate member 904 includes a pair of leg portions 934 and a connecting portion 936 disposed between and connecting the pair of leg portions 934. The pair of leg portions 934 are connected to respective first flange portions 914 and respective second flange portions 920. The leg portions 934 may further be detachably connected to the engine casing 128 via respective fasteners 932. The connecting portion 936 may include an upper curved edge 938 and a lower straight edge 940. However, the connecting portion 936 may have any alternative shape to suit the particular application.

Figure 10:
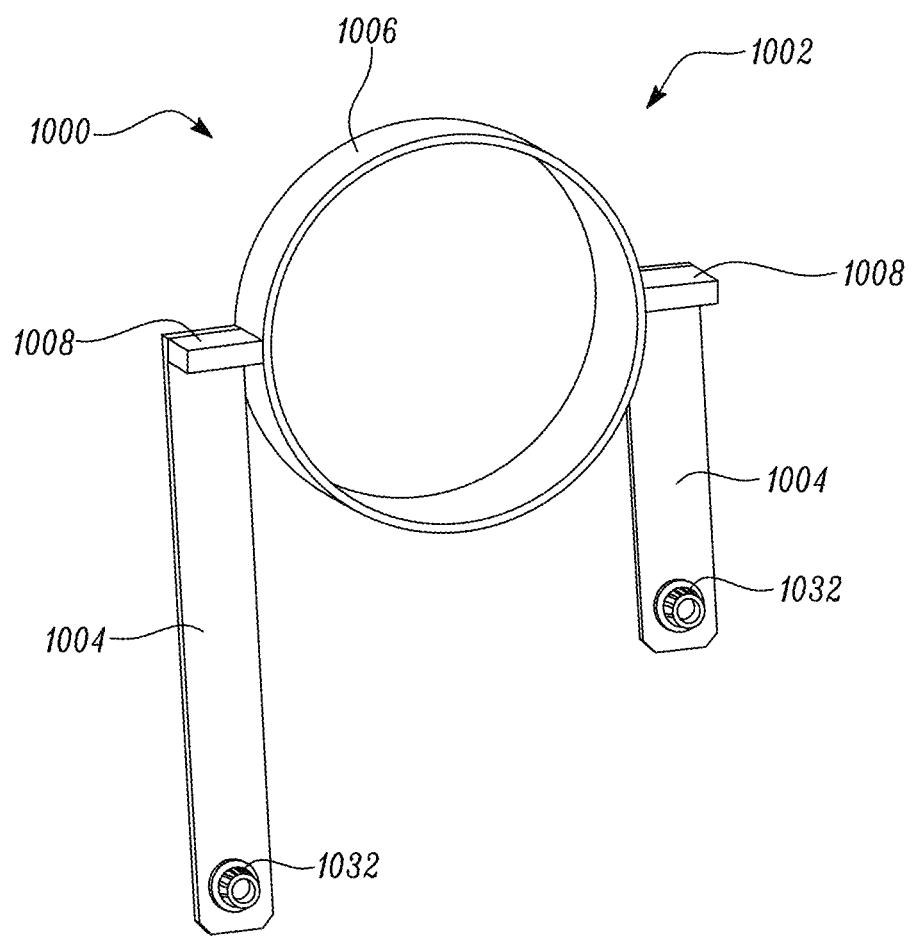
FIG. 10 is a perspective view of an alternative embodiment of the restraining structure.

FIG. 10 illustrates a restraining structure 1000 according to another embodiment of the present disclosure. The restraining structure 1000 is substantially similar to the restraining structure 400 (shown in FIG. 3). However, the restraining structure 1000 does not includes any clipping member. The restraining structure 1000 may be part of the mounting apparatus 200, 401, 500, 600, or 700.

The restraining structure 1000 includes a bracket 1002 circumferentially disposed on the thrust strut 202 and at least one elongate member 1004 connected to the bracket 1002 and the gas turbine engine 100. In the illustrated embodiment of FIG. 10, the restraining structure 1000 includes a pair of the elongate members 1004 equivalent to the pair of elongate members 404 of the restraining structure 400. The bracket 1002 includes an annular portion 1006 disposed around thrust strut 202. In some embodiments, the annular portion 1006 may be connected to the thrust strut 202 via an interference fit. The bracket 1002 further includes a pair of flange portions 1008 connected to the annular portion 1006. The flange portions 1008 may extend from diametrically opposite ends of the annular portion 1006.

The at least one elongate member 1004 is connected to at least one of the pair of flange portions 1008. In the illustrated embodiment, each of the pair of elongate members 1004 is connected to a respective flange portion 1008 of the pair of flange portions 1008. The elongate members 1004 are connected to the engine casing 128 via respective fasteners 1032 that are equivalent to the fasteners 432 of the restraining structure 400.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A mounting apparatus for mounting a gas turbine engine to an aircraft, the mounting apparatus comprising:
   a thrust strut operably connected to the gas turbine engine and the aircraft, the thrust strut defining a thrust strut axis along a length of the thrust strut;
   a restraining structure comprising:
      a bracket circumferentially disposed on the thrust strut and an annular portion disposed around the thrust strut; and
      a pair of elongate members connected to the bracket and the gas turbine engine,
   wherein the restraining structure radially and circumferentially constrains the thrust strut with respect to the thrust strut axis of the thrust strut while allowing the thrust strut to move in the axial direction of the thrust strut axis.

2. The mounting apparatus of claim 1, wherein the pair of elongate members are adapted to flex to allow the thrust strut to move in the axial direction of the thrust strut axis.

3. The mounting apparatus of claim 1, wherein the bracket further comprises a pair of flange portions connected to the annular portion, and wherein the pair of elongate members are connected to the pair of flange portions.

4. The mounting apparatus of claim 1, wherein the pair of elongate members are connected to at least one flange of the gas turbine engine.

5. The mounting apparatus of claim 1, wherein the pair of elongate members are connected to at least one boss of the gas turbine engine.

6. The mounting apparatus of claim 1, wherein the pair of elongate members are connected to an engine casing of the gas turbine engine.

7. The mounting apparatus of claim 1, wherein the pair of elongate members are connected to a nacelle of the gas turbine engine.

8. The mounting apparatus of claim 1, further comprising a plurality of the restraining structures spaced apart from each other along the length of the thrust strut.

9. An aircraft comprising a gas turbine engine, wherein the gas turbine engine is mounted to the aircraft with the mounting apparatus of claim 1.

10. The mounting apparatus of claim 1, wherein the pair of elongate members have different lengths.

11. A mounting apparatus for mounting a gas turbine engine to an aircraft, the mounting apparatus comprising:
- a thrust strut operably connected to the gas turbine engine and the aircraft, the thrust strut defining a thrust strut axis along a length of the thrust strut;
- a restraining structure comprising:
  - a bracket circumferentially disposed on the thrust strut; and
  - a pair of elongate members connected to the bracket and the gas turbine engine,
- wherein the restraining structure radially and circumferentially constrains the thrust strut with respect to the thrust strut axis of the thrust strut while allowing the thrust strut to move in the axial direction of the thrust strut axis, and
- the bracket comprises:
- an annular member disposed around the thrust strut;
- a first clipping member comprising a first curved portion disposed at least partly around the annular member and a pair of first flange portions, wherein each of the pair of first flange portions is disposed at a respective end of the first curved portion; and
- a second clipping member comprising a second curved portion disposed at least partly around the annular member and a pair of second flange portions, wherein each of the pair of second flange portions is disposed at a respective end of the second curved portion, and wherein each of the pair of second flange portions is connected to a respective first flange portion of the pair of first flange portions.

12. The mounting apparatus of claim 11, wherein the pair of elongate members are connected to at least one first flange portion of the pair of first flange portions and at least one second flange portion of the pair of second flange portions.

13. A mounting apparatus for mounting a gas turbine engine to an aircraft, the mounting apparatus comprising:
- a thrust strut operably connected to the gas turbine engine and the aircraft, the thrust strut defining a thrust strut axis along a length of the thrust strut;
- a restraining structure comprising:
  - a bracket circumferentially disposed on the thrust strut; and
  - a pair of elongate members connected to the bracket and the gas turbine engine,
- wherein the restraining structure radially and circumferentially constrains the thrust strut with respect to the thrust strut axis of the thrust strut while allowing the thrust strut to move in the axial direction of the thrust strut axis, and
- the bracket comprises:
- an annular member disposed around the thrust strut; and
- a clipping member comprising:
  - a curved portion disposed at least partly around the annular member, the curved portion comprising a pair of split ends;
  - a pair of first flange portions connected to each other, wherein each of the pair of first flange portions is disposed at a respective split end of the pair of split ends; and
- a second flange portion extending from the curved portion and spaced apart from the pair of first flange portions.

14. The mounting apparatus of claim 13, wherein the pair of elongate members are connected to one or more of the pair of first flange portions and the second flange portion.

\* \* \* \* \*